Feb. 13, 1968 D. J. BURKE ET AL 3,368,790
BALL-TYPE SHUTOFF VALVE
Filed Nov. 10, 1964
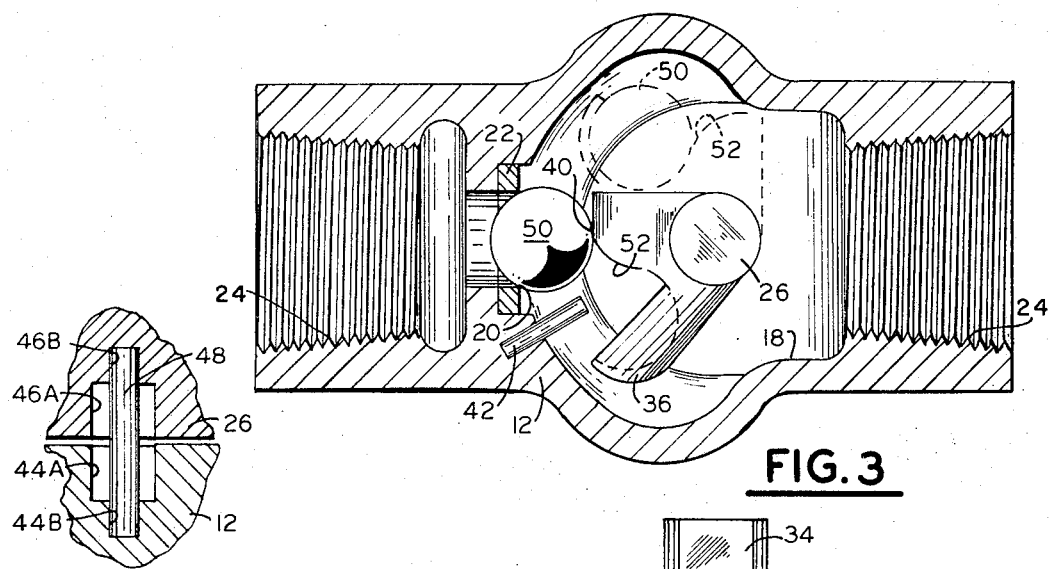
FIG. 3
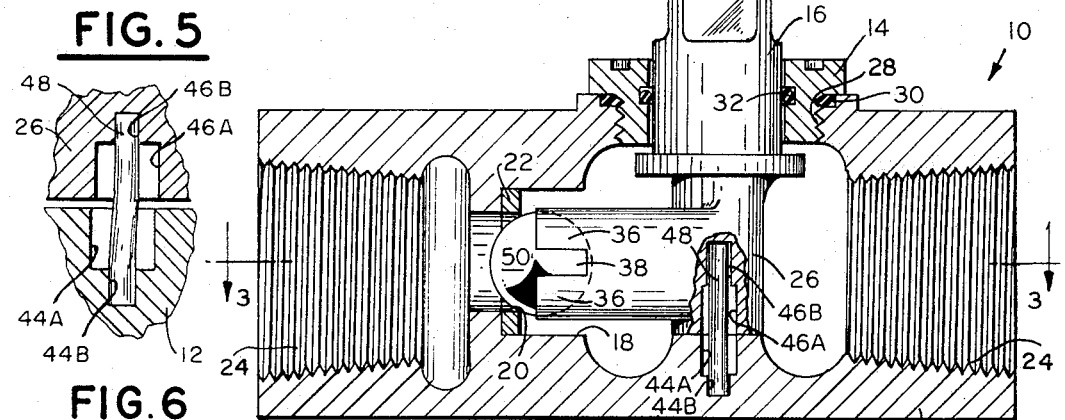
FIG. 5
FIG. 6
FIG. 2
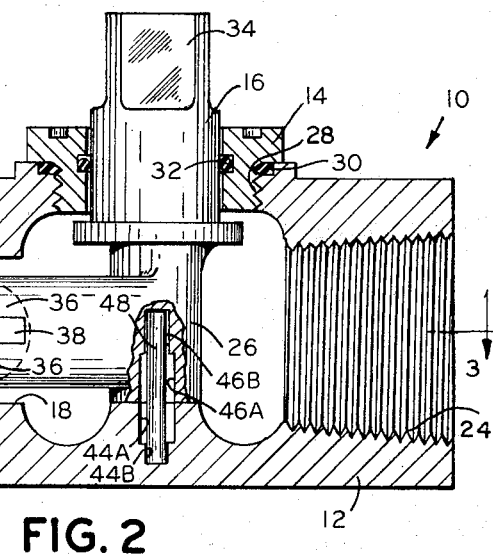
FIG. 4
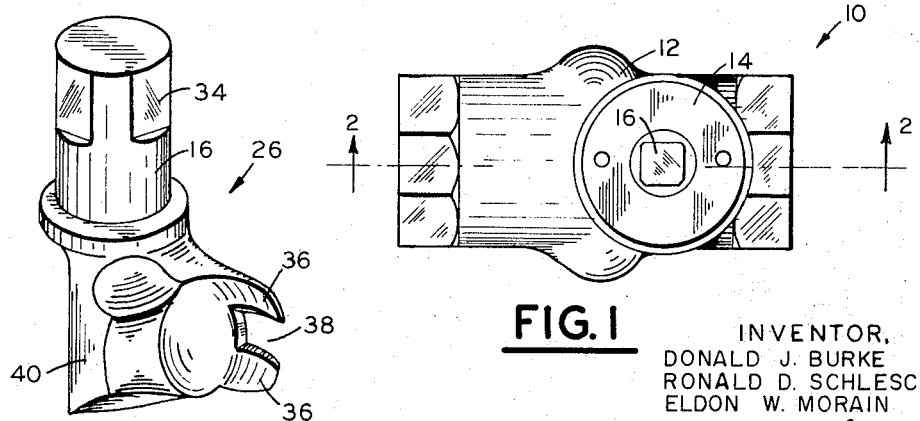
FIG. 1
INVENTOR,
DONALD J. BURKE
RONALD D. SCHLESCH
ELDON W. MORAIN
BY Head & Johnson
ATTORNEYS United States Patent Office 3,368,790
Patented Feb. 13, 1968

3,368,790
BALL-TYPE SHUTOFF VALVE
Donald J. Burke, Ronald D. Schlesch and Eldon W. Morain, Tulsa, Okla., assignors to Continental Industries, Inc., a corporation of Oklahoma
Filed Nov. 10, 1964, Ser. No. 410,064
6 Claims. (Cl. 251—176)

ABSTRACT OF THE DISCLOSURE

This invention is a ball-type shutoff valve including a unitary body having a flow passage therethrough defined in part by a valve seat. A ball is loosely supported within the valve body and is adaptable when moved against the seat to close the valve. An actuating arm is pivotally supported in the body having a shaft portion extending sealably through the body for pivotation. The arm includes two parallel spaced fingers with a slot therebetween and a cam surface spaced from the fingers. In one position the cam surface engages the ball and forces it against the valve seat closing the valve. To open the valve the arm is rotated by the shaft whereby the cam releases pressure against the ball and the fingers grasp the ball and move it away from the valve seat so that the valve is fully open. To prevent the ball from moving out of position during closing a ball retaining pin is fixed to the interior of the valve body adjacent the seat. The retaining pin extends between the fingers as the actuating arm is pivoted to move the ball out of engagement with the seat. In an improved embodiment the invention includes a deflectable hinge pin in axial alignment with the actuating arm, the hinge pin deflecting as the cam surface forces the ball against the valve seat to resiliently retain the ball in sealing engagement with the seat.

---

This invention relates to a valve. More particularly, this invention relates to a ball-type shutoff valve. Still more particularly, this invention relates to a ball-type shutoff valve particularly adapted for use in gas industry characterized by simplicity, economy of construction, and a high degree of dependability.

The objects of this invention are to provide an improved valve having the following characteristics:

(a) A valve utilizing the proven principle of a ball seating against a circular surface to close the valve. In this invention the ball is freely rotatable while the valve is in the open position so that a substantially infinite number of different ball seating surfaces are presented. This assures a high degree of dependability and long life.

(b) A vlave utilizing a freely movable ball to seat against a circular seating surface in a manner wherein the ball is forced against the seating surface by cam action. In addition, in this invention the ball is closed position is held resiliently against the seating surface. Such resilient closing force permits wider manufacturing tolerances and automatically compensates for wear to afford both economy of construction and long effective valve life.

(c) A valve utilizing a freely movable ball forced against a circular seating surface when the valve is closed by means of an actuating arm and including a unique arrangement of a fork actuating arm and a retaining pin positioned adjacent to the seating surface to keep the ball in proper position for closure as the actuating arm is rotated to the closed position.

These objects and other more specific objects of the invention will be set forth and a better understanding of the invention will be had by referring to the following description and claims, taken in conjunction with the attached drawings in which:

FIGURE 1 is an external view of an embodiment of the valve of this invention.

FIGURE 2 is an enlarged cross-sectional view taken along the line 2—2 of FIGURE 1.

FIGURE 3 is a cross-sectional view to the same scale of FIGURE 2 and taken along the line 3—3 of FIGURE 2.

FIGURE 4 is an isometric view of the actuating arm of element of the invention.

FIGURE 5 is an enlarged sectional view of the pivot pin supporting the actuating arm to the housing as the pivot pin appears when the valve is in open position.

FIGURE 6 is a segmented cross-sectional view as shown in FIGURE 5 but showing the configuration of the pivot pin as it is deflected during closure of the valve to resiliently urge the ball into seating position.

This invention may be described as an improved ball-type valve. More particularly, but not in way of limitation, the invention may be described as a valve comprising a body having a flow passageway therethrough with a shaft opening in one side of the body, a portion of the flow passageway being defined by a valve seat, a ball in the flow passageway adaptable when moved against said valve seat to close the valve, an actuating arm within the body flow passageway having an integral shaft portion sealably extending through the shaft opening in the body, the shaft portion pivotally supporting the actuating arm whereby the arm may be pivoted by externally applied torque, the actuating arm being defined in part by two substantially paralleled spaced fingers which engage and move the ball as the arm is pivoted, the actuating arm being further defined by a cam portion adjacent the fingers, said cam portion serving to force said ball into sealed contact with said seat when the actuating arm is pivoted to closed position, a ball retaining pin affixed to the interior of the body adjacent the valve seat, the retaining pin extending between said fingers of said actuating arm as it is pivoted, said pin retaining said ball between said valve seat and said cam portion of the actuating arm as the actuating arm is pivoted to the closed position, and a deflectable axial hinge pin positioned within the body and axially aligned with the actuating arm to pivotally support the actuating arm, the hinge pin being deflectable as the cam surface forces the ball into the valve seat, to resiliently urge the ball into the valve seat.

Referring now to the drawings and first to FIGURE 1, the valve of this invention is indicated generally by the numeral 10. The external parts of the valve include a body 12, an actuating arm retainer 14, and the externally exending shaft portion 16 of an actuating arm.

Referring to FIGURES 2 and 3, the internal mechanisms and the overall construction of the valve is best shown. The valve body 12 is provided with a flow passageway 18 therethrough. A part of the flow passageway is defined by valve seat 20 which may be formed as an integral part of the valve body 12, or preferably, by an insert 22. The valve body may include, as shown, threads 24 at each end by means of which the valve is connected to piping. Pivotally mounted within the flow passageway 18 is an actuating arm 26 pivotally supported by the externally extending shaft portion 16. The actuating arm retainer 14 is received in the body 12 by a threaded shaft opening 28. The gasket 30 is provided between the actuating arm retainer 14 and the body 12, the actuating arm retainer 14 being threaded into the threaded shaft opening 30. An O-ring gasket 32 positioned within the actuating arm retainer 14 seals the shaft portion 16 to prevent escape of gas or fluid.

The external end of the shaft portion 16 is provided with flats 34 to receive a wrench whereby the actuating arm 26 may be pivoted.

Although not shown in the drawings, the body portion 12 may include a threaded boss portion to receive an internally threaded cap to completely and sealably cover the externally extending portion of shaft 16 so that with such a cap in place failure of gaskets 30 and 32 will not permit any leakage of gas or fluid externally of the valve.

The actuating arm 26, as best shown in FIGURE 4, is defined in part by two substantially parallel spaced fingers 36, the fingers 36 providing a notch or space 38 therebetween. In addition, the actuating arm 26 is further defined by a cam surface 40 positioned adjacent the fingers 36.

As best shown in FIGURE 3 a ball retaining pin 42 is affixed to the interior of the valve body 12 and extends within the flow passageway 18 adjacent the valve seat 20. The function of the ball retaining pin 42 will be described subsequently.

Formed in the interior of body 12 and in axial alignment with the threaded shaft opening 28 is a pivot pin recess (see FIGURE 2), which consists, in the preferred embodiment, as shown, of a first larger diameter opening 44A terminating in a smaller diameter portion 44B. Similarly, formed in the end of the actuating arm 26 opposite the shaft portion 16 is a pivot pin recess which consists, in the preferred embodiment, of a first larger diameter portion 46A and terminates in a smaller diameter portion 46B. Rotatably positioned in the pivot pin recesses 44B and 46B is a pivot pin 48.

Positioned within the low passageway 18 of the body 12 is a ball 50. In the opened position of the valve the ball 50 is loosely detained between the valve body and the actuating arm and is free to rotate. The ball 50 is moved by the actuating arm 26 and is controlled in its position by the actuating arm fingers 36 and the opposing inclined surface 52 of the actuating arm 26.

*Operation*

Referring to FIGURE 3, the operation of the valve is best shown. To close the valve the actuating arm 26 is pivoted from the dotted to the illustrated position. As the actuating arm 26 is pivoted towards the closed position the inclined surface 52 moves the ball 50 with it until the area of the seating surface 20 is reached. The ball is prevented from continuing in its travel with the actuating arm by ball retaining pin 25 which holds the ball in the vicinity of the seating surface 20. The ball 50 is then contacted by the cam surface 40 which forces it into firm sealed contact with seating surface 20.

The valve is opened by pivotation of the actuating arm 26 in the opposite direction. The total pivot arc required from total open to closed position is approximately 90° or less. As the actuating arm 26 is pivoted towards open position the cam surface 40 first releases pressure on the ball 50 and then the fingers 36 pick up the ball and move it away from the valve seat surface 20 to permit fluid or gas flow through the valve.

An important characteristic of the valve of this invention is the provision of means whereby the ball 50 is resiliently retained in its position against its valve seat surface 20 so that manufacturing tolerances as well as wear of the valve seat surface 20, the ball 50 and the cam surface 40 is compensated for. This method of resiliently restraining the ball 50 into closed position is illustrated best by referring to FIGURES 5 and 6 which show the function of the pivot pin. FIGURE 5 shows the pivot pin as it appears when the valve is in the open position and no force is applied against the cam surface of the actuating arm 26. Pin 48 supports the actuating arm 26 in alignment. The pin 48 is firmly but pivotally supported by the smaller diameter portions 44B and 46B of the pin receiving recesses.

As the actuating arm is moved to closed position the force of the cam surface against the ball 50 deflects the actuating arm 26 as shown in FIGURE 6. This deflection within the elastic limits of pin 48 applies resilient closing force continually to the ball when in closed position. In addition, as wear occurs in any portions of the valve such wear is absorbed by the resiliency imparted by the deflected pin 48. The provision whereby the smaller diameter portions 44B and 46B of the pin receiving recesses are spaced from each other permits a much greater degree of deflectability of pin 48.

Although this invention has been described with a certain degree of particularity it is manifest many changes may be made in details of the construction and arrangement of components without departing from the spirit and the scope of this disclosure.

What is claimed:

1. A valve comprising:
a body having a flow passageway therethrough, and a shaft opening in one side thereof, a portion of the flow passageway being defined by a valve seat;
a ball in said passageway adaptable, when moved against said valve seat, to close the valve;
an actuating arm within said body passageway having an integral shaft portion sealably extending through said shaft opening, said shaft portion pivotally supporting said actuating arm whereby said arm may be pivoted by externally applied torque, the actuating arm being defined in part by two substantially paralleled spaced fingers which engage and move said ball as the arm is pivoted, the actuating arm being further defined by a cam portion adjacent said fingers, said cam portion serving to force said ball into sealed contact with said seat when the actuating arm is pivoted to closed position;
a ball retaining pin affixed to the interior of the body adjacent the said valve seat, the retaining pin extending between said fingers of said actuating arm as it is pivoted, said pin retaining said ball between said valve seat and said cam portion of said actuating arm as said actuating arm is pivoted to the closed position, said housing and said actuating arm each having a pivot pin recess therein in normal axial alignment with said shaft portion; and
a deflectable hinge pin positioned in said hinge pin openings to axially pivotally support said actuating arm, the hinge pin deflecting as said cam surface forces said ball against said valve seat as said actuating arm is pivoted to the closed position.

2. A valve comprising:
a body having a flow passageway therethrough, and a shaft opening in one side thereof, a portion of the flow passageway being defined by a valve seat;
a ball in said passageway adaptable, when moved against said valve seat, to close the valve;
an actuating arm within said body passageway having an integral shaft portion sealably extending through said shaft opening, said shaft portion pivotally supporting said actuating arm whereby said arm may be pivoted by externally applied torque, the actuating arm being defined in part by two substantially paralleled spaced fingers which engage and move said ball as the arm is pivoted, the actuating arm being further defined by a cam portion adjacent said fingers, said cam portion serving to force said ball into sealed contact with said seat when the actuating arm is pivoted to closed position;
a ball retaining pin affixed to the interior of the body adjacent the said valve seat, the retaining pin extending between said fingers of said actuating arm as it is pivoted, said pin retaining said ball between said valve seat and said cam portion of said actuating arm as said actuating arm is pivoted to the closed position; and
resilient means pivotally supporting the said actuating arm permitting deflection of said actuating arm as said cam surface forces said ball against said valve seat as said actuating arm is pivoted to the closed position to resiliently retain said ball against said valve seat.

3. A valve comprising:

a body having a flow passageway therethrough, a shaft opening in one side thereof, an internal pivot pin recess in the other side in axial alignment with the shaft opening, a portion of the flow passageway being defined by a valve seat;

a ball in said passageway adaptable, when moved against said valve seat, to close the valve;

an actuating arm within said body passageway having an integral shaft portion extending sealably through said shaft opening, a cam surface portion serving to force said ball into sealed engagement with said seating surface as said actuating arm is pivoted to closed position, and a pivot pin recess therein opposite to and in axial alignment with said shaft portion;

a deflectable pivot pin positioned in said pivot pin recess in said body and said actuating arm, to pivotally and deflectably support said actuating arm whereby said pivot pin is deflected as said cam surface forces said ball against said seating surface to resiliently retain said ball in engagement with said valve seat.

4. A valve according to claim 3 wherein each of said pivot pin recesses is defined by a larger diameter opening terminating in a smaller diameter coaxial opening closely receiving said pin whereby said pivot pin is increasingly deflectable.

5. A valve comprising:
(a) a body having
  (1) a flow passageway therethrough,
  (2) a shaft opening in one side thereof,
  (3) a pivot pin recess in the interior of the other side in axial alignment with the said shaft opening, and
  (4) a valve seat defining a portion of said flow passageway;
(b) a ball loosely retained in said flow passageway adaptable, when moved against said valve seat, to close the valve;
(c) an actuating arm within said body passageway having
  (1) an integral shaft portion extending sealably through said body shaft opening whereby said actuating arm may be pivoted by externally applied torque,
  (2) two spaced apart finger portions which engage and move said ball as the arm is pivoted,
  (3) a cam surface adjacent said fingers, said cam surface serving to force said ball into sealed contact with said seat when the actuating arm is pivoted to closed position, and
  (4) a pivot pin recess opposite to and in axial alignment with said shaft portion;
(d) a ball retaining pin affixed at one end to said body and extending within the flow passageway adjacent said valve seat, said fingers of said actuating arm passing to either side of said ball retaining pin as said actuating arm is pivoted, said ball retaining pin serving to retain said ball between said body valve seat and said actuating arm cam surface as said actuating arm is pivoted to the closed position; and
(e) a deflectable pivot pin positioned in said pivot pin recess in said body and said actuating arm, said shaft portion and said actuating pin pivotally and deflectably supporting said actuating arm therebetween whereby said actuating arm is deflectable as said cam surface forces said ball into said valve seat when said actuating arm is pivoted to the closed position whereby said ball is resiliently held in engagement with said valve seat.

6. A valve according to claim 5 wherein each of said pivot pin recesses is defined by a larger diameter opening terminating in a smaller diameter opening closely receiving said pivot pin.

References Cited

UNITED STATES PATENTS

| 2,650,059 | 8/1953 | Hjulion | 137—449 X |
| 2,666,617 | 1/1954 | Paul | 137—271 |
| 2,750,960 | 6/1956 | Hansen | 251—158 X |

CLARENCE R. GORDON, *Primary Examiner.*